(12) United States Patent
Maity et al.

(10) Patent No.: US 10,506,028 B2
(45) Date of Patent: Dec. 10, 2019

(54) TECHNIQUES OF PRESERVING SERVICE REQUEST PAYLOADS

(71) Applicant: American Megatrends International, LLC, Norcross, GA (US)

(72) Inventors: Sanjoy Maity, Snellville, GA (US); Muthukkumaran Ramalingam, Duluth, GA (US); Brandon Burrell, Suwanee, GA (US); Divya Nettem, Suwanee, GA (US)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 191 days.

(21) Appl. No.: 15/623,004

(22) Filed: Jun. 14, 2017

(65) Prior Publication Data

US 2018/0367605 A1 Dec. 20, 2018

(51) Int. Cl.
*G06F 15/173* (2006.01)
*H04L 29/08* (2006.01)
*H04L 12/24* (2006.01)

(52) U.S. Cl.
CPC ...... *H04L 67/1008* (2013.01); *H04L 41/5048* (2013.01); *H04L 67/16* (2013.01); *H04L 67/34* (2013.01)

(58) Field of Classification Search
CPC ..... H04L 67/16; H04L 67/34; H04L 67/1008; H04L 41/0896
See application file for complete search history.

(56) References Cited

U.S. PATENT DOCUMENTS

| | | | |
|---|---|---|---|
| 2017/0286352 A1* | 10/2017 | Kumar | G06F 13/4282 |
| 2018/0027063 A1* | 1/2018 | Nachimuthu | G06F 3/0613 |
| | | | 709/226 |

* cited by examiner

*Primary Examiner* — Yves Dalencourt
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. A first device of the computer system provides a service interface for retrieving stored service request templates for executing actions on a computing pod. The first device receives, at the service interface, a template request for a service request template for constructing a reused service request, the reused service request requesting the computing pod to execute a first action. The first device retrieves the service request template from a data store in accordance with information provided by the template request. The first device sends the service request template in a response to the template request.

14 Claims, 9 Drawing Sheets

```
{
    "Name": "Node1",
    "Description": "Node for MegaRAC",
    "Processors": [{
        "Model": "Multi-Core Intel(R) Xeon(R) processor 7xxx Series",
        "TotalCores": 8,
        "AchievableSpeedMHz": 3700,
        "Oem": { "Brand": "E5" } }],
    "Memory": [{
        "CapacityMiB": 16384,
        "DataWidthBits": 64,
        "MemoryDeviceType": "DDR4"
    }],
    "LocalDrives": [ { "CapacityGiB": 300 } ]
}
```

```
{
    "@odata.context": "/redfish/v1/$metadata#Templates/Members/$entity",
    "@odata.id": "/redfish/v1/Templates/1",
    "@odata.type": "#Template.v1_0_0.Template",
    "Id": "1",
    "Name": "template1",
    "Description": "template for node with E5 DDR4",
    "Type": "Node",
    "Payload": {
        "Name": "Node1",
        "Description": "Node for MegaRAC",
        "Processors": [{
            "Model": "Multi-Core Intel(R) Xeon(R) processor 7xxx Series",
            "TotalCores": 8,
            "AchievableSpeedMHz": 3700,
            "Oem": { "Brand": "E5" } }],
        "Memory": [{
            "CapacityMiB": 16384,
            "DataWidthBits": 64,
            "MemoryDeviceType": "DDR4"
        }],
        "LocalDrives": [{ "CapacityGiB": 300 }]
    }
}
```

TECHNIQUES OF PRESERVING SERVICE REQUEST PAYLOADS

BACKGROUND

Field

The present disclosure relates generally to computer systems, and more particularly, to techniques for of preserving service request payloads sent to a pod manager of a computing pod.

Background

The statements in this section merely provide background information related to the present disclosure and may not constitute prior art.

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may allocate portions of pooled and/or configurable computing resources in order to place or compose a machine or server to implement, execute or run a workload. Various types of applications or application workloads may utilize this allocated infrastructure in a shared manner via access to these placed or composed nodes or servers. As such, there is a need to optimize resources used to manage the physical infrastructure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. A first device of the computer system provides a service interface for retrieving stored service request templates for executing actions on a computing pod. The first device receives, at the service interface, a template request for a service request template for constructing a reused service request, the reused service request requesting the computing pod to execute a first action. The first device retrieves the service request template from a data store in accordance with information provided by the template request. The first device sends the service request template in a response to the template request.

BRIEF DESCRIPTION OF THE DRAWINGS

FIG. 6 shows an exemplary JavaScript Object Notation (JSON) object.

FIG. 7 shows an exemplary JSON template.

DETAILED DESCRIPTION

Figure 1:
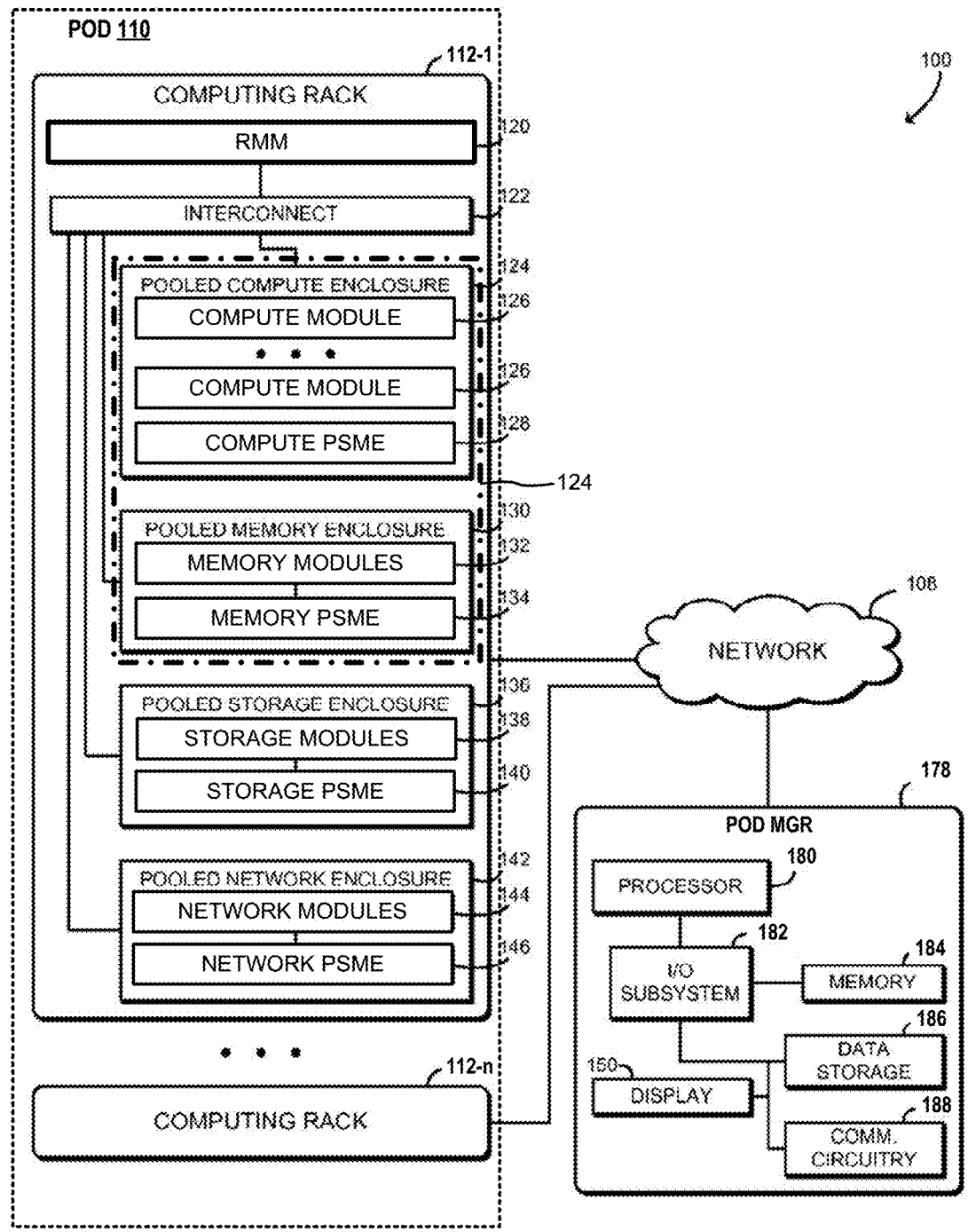
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a system 100 including computing racks 112-1 to 112-n and a pod manager 178 in communication over a network 108. The computing racks 112-1 to 112-n collectively constitute a computing pod 110, which is managed by the pod manager 178 as described infra. In general, a pod is a collection of computing racks within a shared infrastructure domain.

In use, computing applications or other workloads may be distributed over any number of the computing racks 112-1 to 112-n using available computing elements of the system 100 (e.g., compute nodes, memory, storage, or networking). The pod manager 178 manages resources of the system 100, for example including the current distribution and scheduling of workloads among the computing elements of the computing racks 112-1 to 112-n. The pod manager 178 can translate human input received into a number of machine-readable user-defined optimization rules. The pod manager 178 can optimize workload of the computing racks 112-1 to 112-n (e.g., optimize the placement and/or scheduling of workloads among the computing elements of the system 100) using the user-defined optimization rules well as pre-defined goals and constraints.

The system 100 may allow improved scheduling and placement of workload in a highly heterogeneous (e.g., disaggregated and/or modular) datacenter environment, with multiple internal (e.g., efficiency) and/or external (e.g., service delivery objective) constraints. Additionally, the system 100 may enable service providers to offer a wide range of service levels and templates to customers, due to the service provider's ability to optimally profit from all computing elements of the system 100 while managing operational cost tightly. Additionally, although described as being performed by the pod manager 178, in certain configurations some or all of those functions may be performed by other elements of the system 100, such as one or more computing racks 112-1 to 112-n.

Each of the computing racks 112-1 to 112-n may be embodied as a modular computing device that, alone or in combination with other computing racks 112-1 to 112-n, is capable of performing the functions described herein. For example, the computing rack 112-1 may be embodied as a chassis for rack-mounting modular computing units such as compute drawer/trays, storage drawer/trays, network drawer/trays, and/or traditional rack-mounted components such as servers or switches.

In this example, each of the computing racks 112-1 to 112-n may include a rack management module (RMM) 120 and one or more of an interconnect 122 coupled to a pooled compute enclosure 124, a pooled memory enclosure 130, a pooled storage enclosure 136, and a pooled network enclosure 142. The RMM 120 is responsible for managing the rack, which may include assigning IDs for pooled system management engines (PSMEs) and managing the rack power and cooling. Of course, each of the computing racks 112-1 to 112-n may include other or additional components, such as those commonly found in a server device (e.g., power distribution systems, cooling systems, or various input/output devices), in other embodiments.

In certain configurations, each of the pooled compute enclosure 124, the pooled memory enclosure 130, the pooled storage enclosure 136, and the pooled network enclosure 142 may be embodied as a tray, expansion board, or any other form factor, and may be further referred to as a "drawer." In such configurations, each enclosure/drawer may include any number of function modules or computing components, which may be allocated to an application or workload. As each of the computing racks 112-1 to 112-n includes drawers, individual components may be replaced or upgraded and may be "hot swappable." For example, in certain configurations, the pooled compute enclosure 124 may be embodied as a CPU tray including one or more compute modules 126. Each compute module 126 may include a blade having multiple processors and/or processing/controlling circuits. In such configurations, additional processing power may be added to the computing rack 112-1 by swapping out the pooled compute enclosure 124 with another pooled compute enclosure 124 including newer and/or more powerful processors.

The pooled compute enclosure 124 may be embodied as any modular computing unit such as a compute tray, expansion board, chassis, or other modular unit. As described supra, the pooled compute enclosure 124 may include one or more compute modules 126. Each compute module 126 may include a processor blade capable of performing the functions described herein. Each processor blade may include a single or multi-core processor(s), digital signal processor, microcontroller, or other processor or processing/controlling circuit. The compute modules 126 may be heterogeneous; for example, some of the compute modules 126 may be embodied as high-performance server processors and others of the compute modules 126 may be embodied as low-powered processors suitable for higher density deployment.

Further, in certain configurations, the pooled compute enclosure 124 may include a compute PSME 128. The compute PSME 128 may be embodied as any performance counter, performance monitoring unit, or other hardware monitor capable of generating, measuring, or otherwise capturing performance metrics of the compute modules 126 and/or other components of the pooled compute enclosure 124.

The pooled memory enclosure 130 may be embodied as any modular memory unit such as a memory tray, expansion board, chassis, or other modular unit. The pooled memory enclosure 130 includes memory modules 132. Each of the memory modules 132 may have a memory blade containing one or more memories capable of being partitioned, allocated, or otherwise assigned for use by one or more of the compute modules 126 of the pooled compute enclosure 124. For example, the memory blade may contain a pooled memory controller coupled to volatile or non-volatile memory, such as a large number of conventional RAM DIMMs. In operation, the pooled memory enclosure 130 may store various data and software used during operation of the computing rack 112-1 such as operating systems, virtual machine monitors, and user workloads.

Further, in certain configurations, the pooled memory enclosure 130 may include a memory PSME 134. The memory PSME 134 may be embodied as any performance counter, performance monitoring unit, or other hardware monitor capable of generating, measuring, or otherwise capturing performance metrics of the memory modules 132 and/or other components of the pooled memory enclosure 130.

In certain configurations, the computing rack 112-1 may not have a separate pooled memory enclosure 130. Rather, the pooled memory enclosure 130 may be incorporated into the pooled compute enclosure 124. As such, the computing rack 112-1 includes a combined pooled compute enclosure 124' that contains both processors and memories. In particular, in one configuration, a compute module 126 of the combined pooled compute enclosure 124' may include both processors and memories that function together. Accordingly, the compute PSME 128 manages both the processor resources and the memory resources. In another configuration, the combined pooled compute enclosure 124' may include one or more compute modules 126 as well as one or more memory modules 132.

Similarly, the pooled storage enclosure 136 may be embodied as any modular storage unit such as a storage tray, expansion board, chassis, or other modular unit. The pooled storage enclosure 136 includes storage modules 138. Each of the storage modules 138 may have a storage blade containing any type of data storage capable of being partitioned, allocated, or otherwise assigned for use by one or more of the compute modules 126 of the combined pooled compute enclosure 124'. For example, the storage blade may contain one or more memory devices and circuits, memory cards, hard disk drives, solid-state drives, or other data storage devices. Further, the storage modules 138 may be configured to store one or more operating systems to be initialized and/or executed by the computing rack 112-1.

Further, in certain configurations, the pooled storage enclosure 136 may include a storage PSME 140. The storage PSME 140 may be embodied as any performance counter, performance monitoring unit, or other hardware monitor capable of generating, measuring, or otherwise capturing performance metrics of the storage modules 138 and/or other components of the pooled storage enclosure 136.

Similarly, the pooled network enclosure 142 may be embodied as any modular network unit such as a network tray, expansion board, chassis, or other modular unit. The pooled network enclosure 142 includes network modules 144. Each of the network modules 144 may have a blade containing any communication circuit, device, or collection thereof, capable of being partitioned, allocated, or otherwise assigned for use by one or more of the compute modules 126 of the combined pooled compute enclosure 124'. For example, the network blade may contain any number of network interface ports, cards, or switches. In certain configurations, the network modules 144 may be capable of operating in a software-defined network (SDN). The network modules 144 may be configured to use any one or more communication technology (e.g., wired or wireless communications) and associated protocols (e.g., Ethernet, Bluetooth®, Wi-Fi®, WiMAX, etc.) to effect such communication.

Further, in certain configurations, the network enclosure 142 may include a network PSME 146. The network PSME 146 may be embodied as any performance counter, performance monitoring unit, or other hardware monitor capable of generating, measuring, or otherwise capturing performance metrics of the network modules 144 and/or other components of the pooled network enclosure 142.

In certain configurations, the combined pooled compute enclosure 124', the pooled storage enclosure 136, and the pooled network enclosure 142 are coupled to each other and to other computing racks 112-1 to 112-n through the interconnect 122. The interconnect 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the computing elements of the computing rack 112-1. For example, in certain configurations, the interconnect 122 may be embodied as or include a silicon photonics switch fabric and a number of optical interconnects. Additionally or alternatively, in certain configurations, the interconnect 122 may be embodied as or include a top-of-rack switch.

The RMM 120 may be implemented by any computing node, micro-controller, or other computing device capable of performing workload management and orchestration functions for the computing rack 112-1 and otherwise performing the functions described herein. For example, the RMM 120 may be embodied as one or more computer servers, embedded computing devices, managed network devices, managed switches, or other computation devices. In certain configurations, the RMM 120 may be incorporated or otherwise combined with the interconnect 122, for example in a top-of-rack switch.

As described supra, in certain configurations, the system 100 may include a pod manager 178. A pod manager 178 is configured to provide an interface for a user to orchestrate, administer, or otherwise manage the system 100. The pod manager 178 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. In certain configurations, the pod manager 178 may be embodied as a distributed system, for example with some or all computational functions performed by the computing racks 112-1 to 112-n and with user interface functions performed by the pod manager 178. Accordingly, although the pod manager 178 is illustrated in FIG. 1 as embodied as a single server computing device, it should be appreciated that the pod manager 178 may be embodied as multiple devices cooperating together to facilitate the functionality described infra. As shown in FIG. 1, the pod manager 178 illustratively includes a processor 180, an input/output subsystem 182, a memory 184, a data storage device 186, and communication circuitry 188. Of course, the pod manager 178 may include other or additional components, such as those commonly found in a workstation (e.g., various input/output devices), in other embodiments. Additionally, in certain configurations, one or more of the illustrative components may be incorporated in, or otherwise form a portion of, another component. For example, the memory 184, or portions thereof, may be incorporated in the processor 180 in certain configurations.

The processor 180 may be embodied as any type of processor capable of performing the functions described herein. The processor 180 may be embodied as a single or multi-core processor(s), digital signal processor, micro-controller, or other processor or processing/controlling circuit. Similarly, the memory 184 may be embodied as any type of volatile or non-volatile memory or data storage capable of performing the functions described herein. In operation, the memory 184 may store various data and software used during operation of the pod manager 178 such as operating systems, applications, programs, libraries, and drivers. The memory 184 is communicatively coupled to the processor 180 via the I/O subsystem 182, which may be embodied as circuitry and/or components to facilitate input/output operations with the processor 180, the memory 184, and other components of the pod manager 178. For example, the I/O subsystem 182 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In certain configurations, the I/O subsystem 182 may form a portion of a system-on-a-chip (SoC) and be incorporated, along with the processor 180, the memory 184, and other components of the pod manager 178, on a single integrated circuit chip.

The data storage device 186 may be embodied as any type of device or devices configured for short-term or long-term storage of data such as, for example, memory devices and circuits, memory cards, hard disk drives, solid-state drives, or other data storage devices. The communication circuitry 188 of the pod manager 178 may be embodied as any communication circuit, device, or collection thereof, capable of enabling communications between the pod manager 178, the computing racks 112-1 to 112-n, and/or other remote devices over the network 108. The communication circuitry 188 may be configured to use any one or more communication technology (e.g., wired or wireless communications) and associated protocols (e.g., Ethernet, Bluetooth®, Wi-Fi®, WiMAX, etc.) to effect such communication.

The pod manager 178 further includes a display 190. The display 190 of the pod manager 178 may be embodied as any type of display capable of displaying digital information such as a liquid crystal display (LCD), a light emitting diode (LED), a plasma display, a cathode ray tube (CRT), or other type of display device. As further described below, the display 190 may present an interactive graphical user interface for management of the system 100.

As described infra, the computing racks 112-1 to 112-n and the pod manager 178 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Although each of the computing racks 112-1 to 112-n has been illustrated as including a single combined pooled compute enclosure 124', a single pooled storage enclosure 136, and a single pooled network enclosure 142, it should be understood that each of the computing racks 112-1 to 112-n may include any number and/or combination of those modular enclosures.

Figure 2:
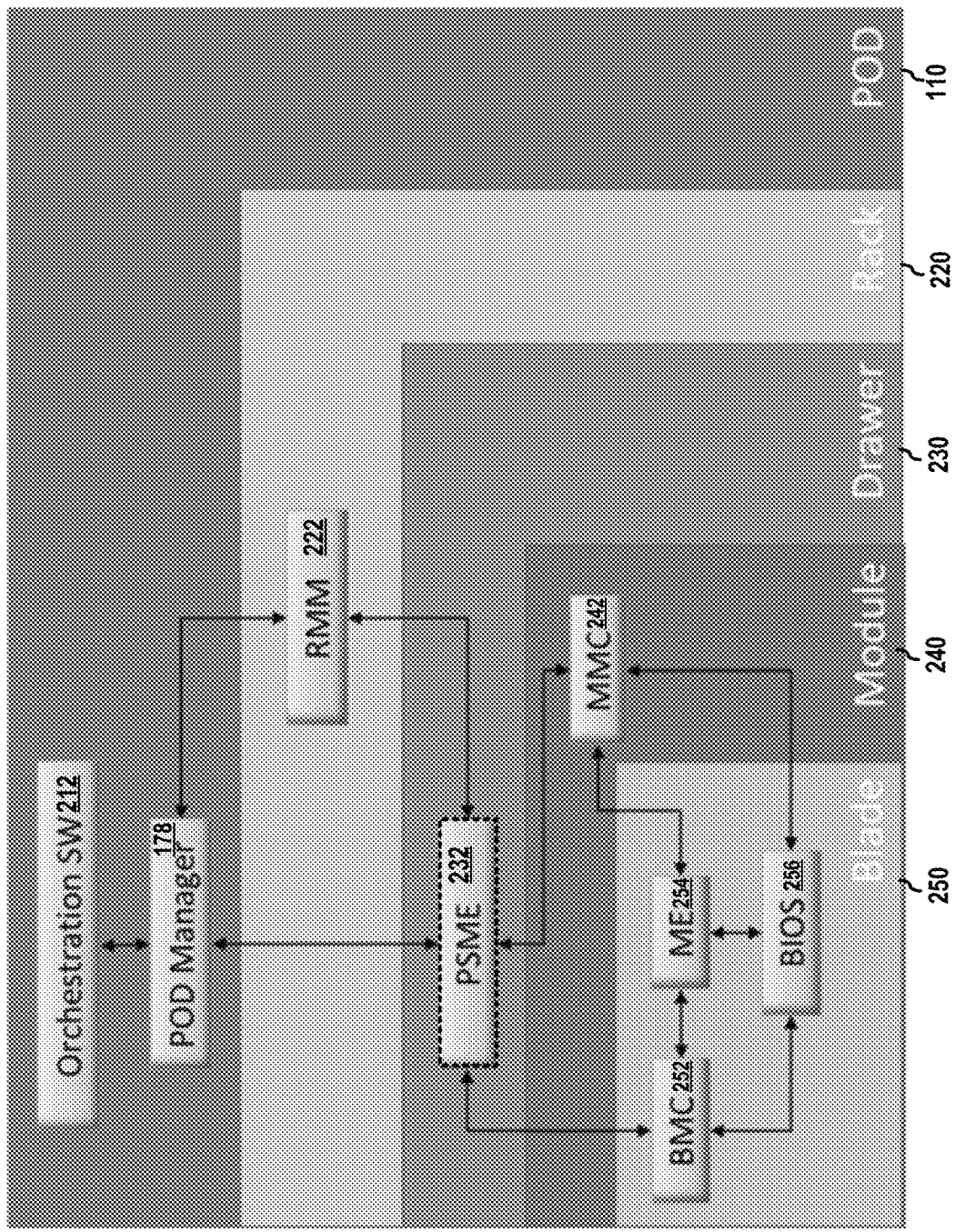
FIG. 2 is a diagram illustrating a logical hierarchy of a computer system.

FIG. 2 is a diagram 200 illustrating a logical hierarchy of the system 100. As described supra, the pod manager 178 manages the computing pod 110. An orchestration module 212 may send a request to the pod manager 178 for a composed node. Accordingly, the pod manager 178 may allocate resources of the computing pod 110 to build the requested composed node. A composed node may include resources from compute, memory, network, and storage modules.

Further, as shown, the computing pod 110 includes at least one computing rack 220. Each computing rack 220, which may be any one of the computing racks 112-1 to 112-n, includes a RMM 222 (e.g., the RMM 120). The computing rack 220 also includes at least one computing drawer 230, each of which may be any one of the combined pooled compute enclosure 124', the pooled storage enclosure 136, and the pooled network enclosure 142. In certain configurations, each computing drawer 230 may include a PSME 232, which may be any corresponding one of the compute PSME 128, the memory PSME 134, the storage PSME 140, and the network PSME 146.

The computing drawer 230 also includes at least one module 240, which may be any corresponding one of the compute module 126, the memory module 132, the storage module 138, and the network module 144. Each module 240 includes a module management controller MMC 242 that services the module 240 and manages the blades in the module 240.

Each module 240 also includes at least one computing blade 250. Each computing blade 250 includes a baseboard management controller (BMC) 252, a management engine (ME) 254, and a Basic Input/Output System (BIOS) 256. The PSME 232 is in communication with the MMC 242 and the BMC 252. The BMC 252 is in communication with the BIOS 256 and the ME 254.

In particular, the pod manager 178 is responsible for discovery of resources in the computing pod 110, configuring the resources, power and reset control, power management, fault management, monitoring the resources usage. The pod manager 178 interacts with the RMM 120 and the PSME 232 to create representation of the computing pod 110. The pod manager 178 allows composing a physical node to match the logical node requirements specified by the solution stack. Such composition is able to specify a system at a sub-composed node granularity.

The pod manager 178 may be connected to the RMM 222 and the PSME 232 through the network 108 (e.g., a private network). A management related activity such as reconfiguration may be performed after establishing a secure communication channel between the pod manager 178 and the PSME 232 and between the pod manager 178 and the RMM 222.

The RMM 222 may be responsible for handling infrastructure functions of the computing rack 220 such as power, cooling, and assigning PSME IDs. The RMM 222 may also support power monitoring at rack level. This feature helps the pod manager 178 take actions to keep the rack within its power budget.

As described supra, the computing rack 220 is made-up of drawers such as the computing drawer 230. The computing rack 220 provides a mechanism to manage rack level end point components down to the drawer level. In particular, the PSME 232 provides management interface to manage the modules/blades (e.g., the module 240/the computing blade 250) at a drawer level. In certain configurations, the PSME 232 may service multiple drawers, as long as the drawer is uniquely addressable and provides the necessary instrumentation. For example, if each drawer has a microcontroller to provide the necessary instrumentation for all drawer requirements (such as module presence detection) and is interfaced to the RMM 222, then the PSME 232 could physically run in the RMM 222 and represent each drawer instance.

In certain configurations, the PSME 232 may be responsible for drawer identification management and for communicating with the BMC 252 and the MMC 242 perform node-level management. If the RMM 222 is not present in the computing rack 220, the PSME 232 in the computing rack 220 would provide the RMM functionality. The PSME 232 may also provide individual node reset support including power on and power off of the drawer and modules (e.g., the module 240 and the computing blade 250) that are managed by the PSME 232.

Figure 3:
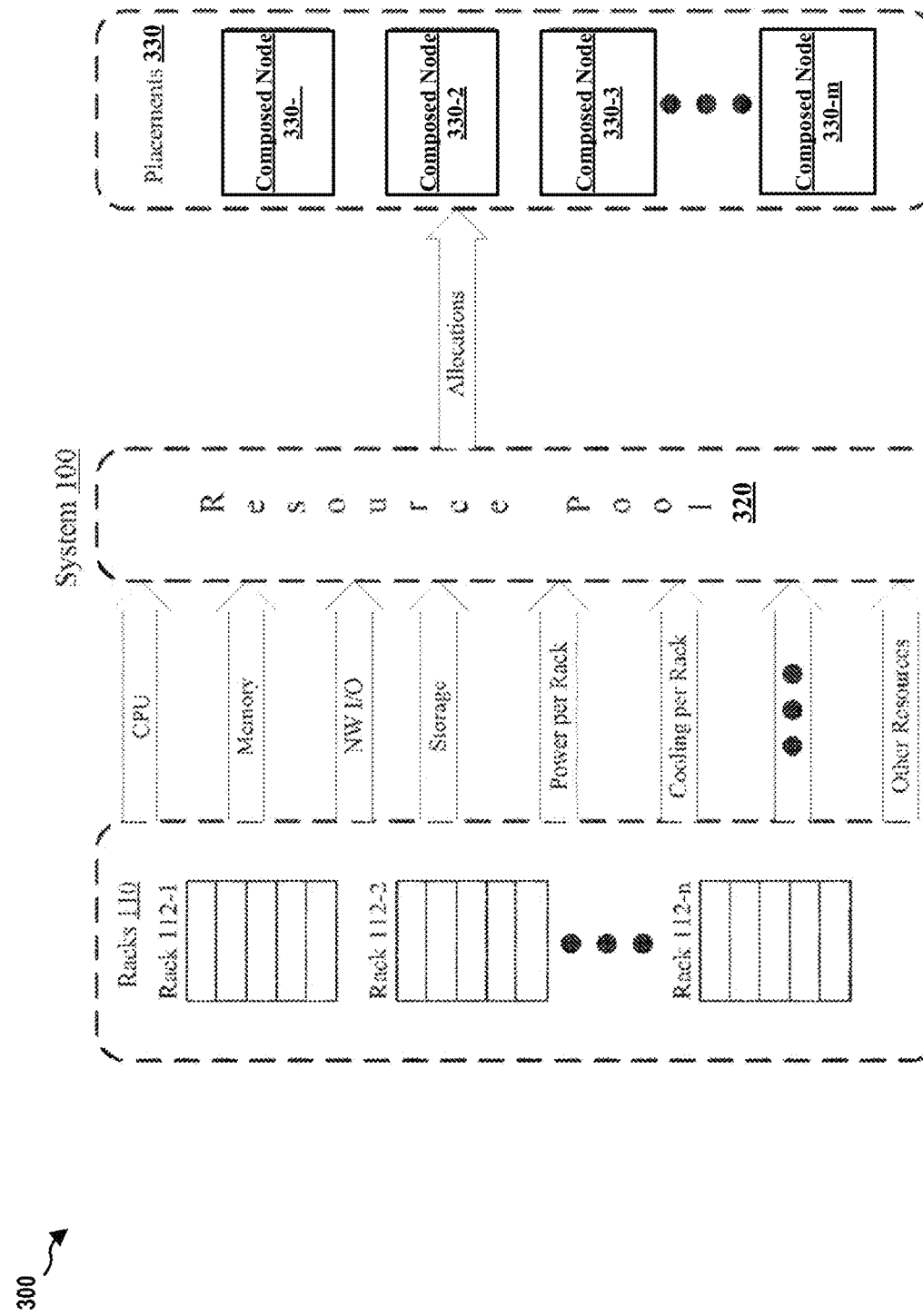
FIG. 3 is a diagram illustrating allocation of resources of a computer system.

FIG. 3 is a diagram 300 illustrating allocation of resources of the system 100. In certain configurations, as described supra, machines (or servers) can be logically composed from pools of disaggregated physical elements of the system 100 to implement or execute incoming workload requests. These composed nodes may be deployed in large data centers. The composed nodes may also be part of software defined infrastructure (SDI). SDI-enabled data centers may include dynamically composed nodes to implement or execute workloads.

As described supra, the system 100 may include the computing racks 112-1 to 112-n, where "n" is a positive integer. Each rack may include various configurable computing resources. These configurable computing resources may include various types of disaggregated physical elements. Types of disaggregated physical elements may include, but are not limited to, CPU types (e.g., the compute modules 126), memory types (e.g., the memory modules 132), storage types (e.g., the storage modules 138), network I/O types (e.g., the network modules 144), power types (e.g., power bricks), cooling types (e.g., fans or coolant) or other types of resources (e.g., network switch types). These configurable computing resources may be made available (e.g., to a resource manager or controller) in a resource pool 320.

In certain configurations, various configurable computing resources of the system 100 may be made available in the resource pool 320 for allocation to build a composed node. A composed node, for example, may be composed to implement or execute a workload. At least a portion (e.g., a configuration) of available configurable computing resources in the resource pool may be allocated to support placements 330. As shown in FIG. 3, placements 330 include composed nodes 332-1 to 332-m, where "m" is any positive integer.

As described infra, certain logic and/or features of the system 100 may also be capable of monitoring operating attributes for each configurable computing resource allocated to compose or place a composed node while the composed node implements, runs or executes a workload.

According to some examples, each of the composed nodes 332-1 to 332-m may be used to run one or more virtual machines (VMs). For these examples, each of the one or VMs may be allocated a portion of a composed node (i.e., allocated configurable computing resources). In other examples, a composed node may be allocated directly to a given VM.

Figure 4:
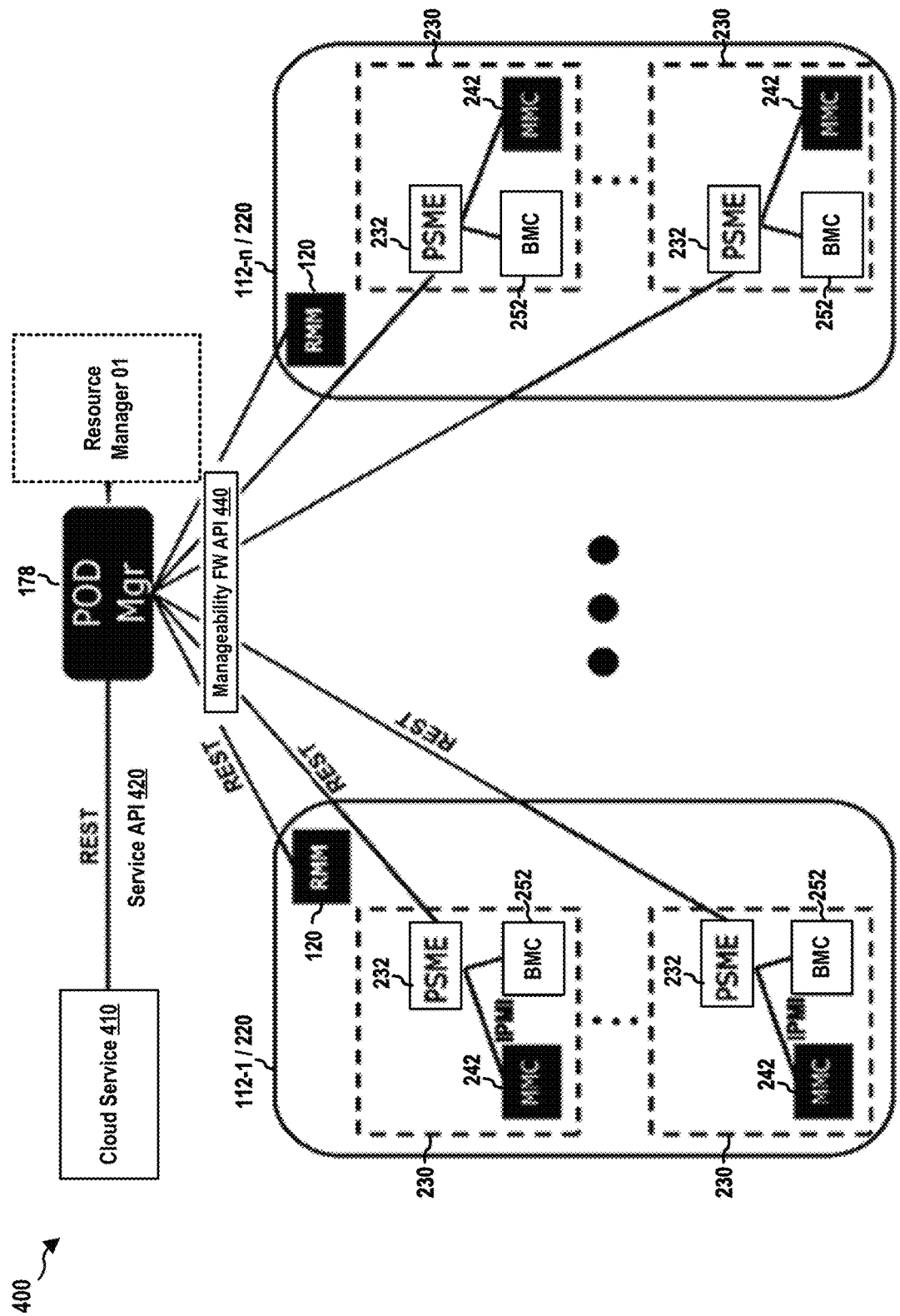
FIG. 4 is a diagram illustrating a rack management structure of a computer system.

FIG. 4 is a diagram illustrating a rack management structure 400 of the system 100. In some examples, as shown in FIG. 4, the rack management structure 400 includes various managers and application programming interfaces (APIs). For example, a cloud service 410 may interface through a service API 420 (e.g., orchestration interface) as a common service application interface (API) to communicate with the pod manager 178. The pod manager 178 manages the computing racks 112-1 to 112-n including various types of disaggregated physical elements (e.g., the computing drawer 230).

In certain configurations, the pod manager 178 may include a resource manager 401 that includes logic and/or features capable of allocating these disaggregated physical elements (e.g., the compute modules 126, the memory modules 132, the storage modules 138, the network modules 144) responsive to a request from a cloud service 410 to allocate configurable computing resources to a composed node to implement or execute a workload that may be associated with the cloud service 410. The workload, for example, may be an application workload such as, but not limited to, video processing, encryption/decryption, a web server, content delivery or a database. The resource manager 401 may maintain a resource catalog to track what configurable computing resources have been allocated and also what configurable computing resources may be available to allocation responsive to subsequent requests from the cloud service 410.

In certain configurations, the pod manager 178 may utilize a manageability firmware (FW) API 440, which is a Representational State Transfer (REST)-based API, to access to the configurable computing resources at the computing racks 112-1 to 112-n. This access may include access to disaggregated physical elements maintained at racks as well as metadata for technologies deployed in these racks that may include gathered operating attributes for these disaggregated physical elements. In particular, the manageability FW API 440 provides access to the RMM 120 and the PSME 232 (e.g., the compute PSME 128, the memory PSME 134, the storage PSME 140, and the network PSME 146) of each computing drawer 230 in the computing racks 112-1 to 112-n.

REST-based or RESTful Web services are one way of providing interoperability between computer systems on the Internet. REST-compliant Web services allow requesting systems to access and manipulate textual representations of Web resources using a uniform and predefined set of stateless operations. In a RESTful Web service, requests made to a resource's URI will elicit a response that may be in XML, HTML, JSON or some other defined format. The response may confirm that some alteration has been made to the stored resource, and it may provide hypertext links to other related resources or collections of resources. Using HTTP, as is most common, the kind of operations available include those predefined by the HTTP verbs GET, POST, PUT, DELETE and so on. By making use of a stateless protocol and standard operations, REST systems aim for fast performance, reliability, and the ability to grow, by re-using components that can be managed and updated without affecting the system as a whole, even while it is running.

In certain configurations, the RMM 120 may also provide access to the physical and logical asset landscapes or mapping in order to expedite identification of available assets and allocate configurable computing resources responsive to requests to compose or place a composed node to implement or execute a workload.

In certain configurations, the RMM 120 may provide a rack level user interface in order to fulfill several basic functions, such as discovery, reservation, polling, monitoring, scheduling and usage. Also, the RMM 120 may be utilized for assembly of higher order computing resources in a multi-rack architecture (e.g., to execute a workload).

In certain configurations, the RMM 120 may report assets under its management to the pod manager 178 that includes the resource manager 401. For these examples, resource manager 401 may include logic and/or features capable of assisting the pod manager 178 in aggregating an overall physical asset landscape structure from all racks included in the pod of racks managed by the pod manager 178 into a single multi-rack asset. According to some examples, the RMM 120 may also receive and/or respond to requests from the pod manager 178 via the manageability FW API 440 (i.e., a REST API).

According to some examples, the pod manager 178 may receive a request to allocate a portion of the configurable computing resources maintained in the computing racks 112-1 to 112-n. For these examples, the pod manager 178 may receive the request through the service API 420 in a standardized protocol format such as the Open Virtualization Format (OVF). OVF may include hints (e.g., metadata) of a type of workload. The pod manager 178 may be capable of determining what hardware configuration may be needed to place or compose a composed node to implement or execute the workload. The pod manager 178 may then forward the request and indicate the hardware configuration possibly needed to the resource manager 401. For example, a configuration of configurable computing resources including various types of disaggregate physical elements such as CPUs, memory, storage and NW I/O needed to implement, run, or execute the workload.

The pod manager 178 may discover and communicate with the RMM 222 of each computing rack 220 and the PSME 232 of each computing drawer 230.

Referring back to FIG. 2, in this example, the computing blade 250, among other components, includes the service processor 251. As described infra, the service processor 251 may implement the BMC 252 and the PSME 253. As such, each computing drawer 230 of the computing rack 220 may not need a separate micro-controller or other computing device to implement a PSME. In other words, the computing drawer 230 does not include the PSME 232.

The PSME 253 implemented by the service processor 251 (in any blade of the computing rack 220) may provide functions and APIs similar to those of the PSME 232 with some differences noted here. For example, the PSME 253 of a particular computing blade 250 may not discover or service all the BMCs, MEs, and BIOSes in all the other blades of the computing drawer 230. Rather, the PSME 253 of that particular computing blade 250 may only discover and service the BMC 252, the BIOS 256, and/or the ME 254 of that particular computing blade 250.

On the other hand, the pod manager 178 may discover all the PSMEs in the pod (i.e., the PSME 253 of each blade in the computing racks 112-1 to 112-n). Each PSME 253 may provide information of the BMC/BIOS/ME on the same blade and serviced by that PSME 253 to the pod manager 178. Further, one PSME 253 of a particular computing blade 250 may service the corresponding computing drawer 230 (i.e., the drawer containing the particular computing blade 250) at the draw level, similar to that the PSME 232 services the computing drawer 230 at the drawer level (e.g., providing information regarding the computing drawer to the pod manager 178).

The BMC 252 may support Intelligent Platform Management Interface standard (IPMI). IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc. The BMC 252 may be in communication with the computing blade 250 and may manage the computing blade 250.

Further, the PSME 232 may include REST services. The pod manager 178 may access the REST services through the manageability FW API 440. The REST services provide the REST-based interface that allows full management of the PSME 232, including asset discovery and configuration. For example, the REST services may be a REDFISH® server. REDFISH® is an open industry standard specification and schema that specifies a RESTful interface and utilizes JSON and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference.

When the computing drawer 230 is a compute drawer, the PSME 232 may provide to the pod manager 178 information of and functions to operate on a processor collection resource, which provides collection of all processors available in a blade.

When the computing drawer 230 is a memory drawer or a compute drawer including a memory), the PSME 232 may provide to the pod manager 178 information of and functions to operate on a memory collection resource, which provides collection of all memory modules installed in a computer system. The PSME 232 may also provide information of and functions to operate on a memory chunks collection resource, which provides collection of all memory chunks in a computer system. The PSME 232 may further provide to the pod manager 178 information of and functions to operate on a storage adapters collection resource, which provides collection of all storage adapters available in a blade. The PSME 232 may also provide to the pod manager 178 information of and functions to operate on a storage adapter resource, which provides detailed information about a single storage adapter identified by adapter ID. The PSME 232 may provide to the pod manager 178 information of and functions to operate on a storage device collection resource, which provides collection of all storage devices available in a storage adapter. The PSME 232 may also provide to the pod manager 178 information of and functions to operate on a device resource, which provides detailed information about a single storage device identified by device ID.

When the computing drawer 230 is a networking drawer, the PSME 232 may provide to the pod manager 178 information of and functions to operate on a Blade Network Interface resource, which provides detailed information about a network interface identified by NIC ID.

In addition, the PSME 232 may provide to the pod manager 178 information of and functions to operate on a manager collection resource, which provides collection of all managers available in the computing drawer 230. The PSME 232 may provide to the pod manager 178 information of and functions to operate on chassis collection resource, a chassis resource. a computer systems collection, and a computer system resource, The PSME 232 may provide to the pod manager 178 information of and functions to operate on one or more of the following: a manager resource that provides detailed information about a manager identified by manager ID; a switch collection resource that provides collection of all switches available in a fabric module; a switch resource that provides detailed information about a switch identified by switch ID; a switch port collection resource that provides collection of all switch port available in a switch; a switch port resource that provides detailed information about a switch port identified by port ID; a switch ACL collection resource that provides collection of all Access Control List (ACL) defined on switch; a switch ACL resource that provides detailed information about a switch Access Control List defined on switch; a switch ACL rule collection resource that provides collection of all rules for Access Control List (ACL) defined on switch; a switch ACL rule resource that provides detailed information about a switch ACL rule defined identified by rule ID; a switch port static MAC collection resource that provides collection of all static MAC forwarding table entries; a switch port static MAC resource that provides detailed information about a static MAC address forward table entry; a network protocol resource that provides detailed information about all network services supported by a manager identified by manager ID; a Ethernet interface collection resource that provides collection of all Ethernet interfaces supported by a manager identified by manager ID or included in a blade identified by blade ID; a Ethernet interface resource that provides detailed information about a Ethernet interface identified by NIC ID; a VLAN Network Interface collection resource that provides collection of all VLAN network interfaces existing on a switch port identified by port ID or network interface identified by NIC ID; a VLAN Network Interface resource that provides detailed information about a VLAN network interface identified by VLAN ID; an event service resource responsible for sending events to subscribers; an event subscription collection, which is a collection of Event Destination resources; an event subscription contains information about type of events user subscribed for and should be sent; and a definition of event array that is POST-ed by Event Service to active subscribers, event array representing the properties for the events themselves and not subscriptions or any other resource, each event in this array having a set of properties that describe the event.

Figure 5:
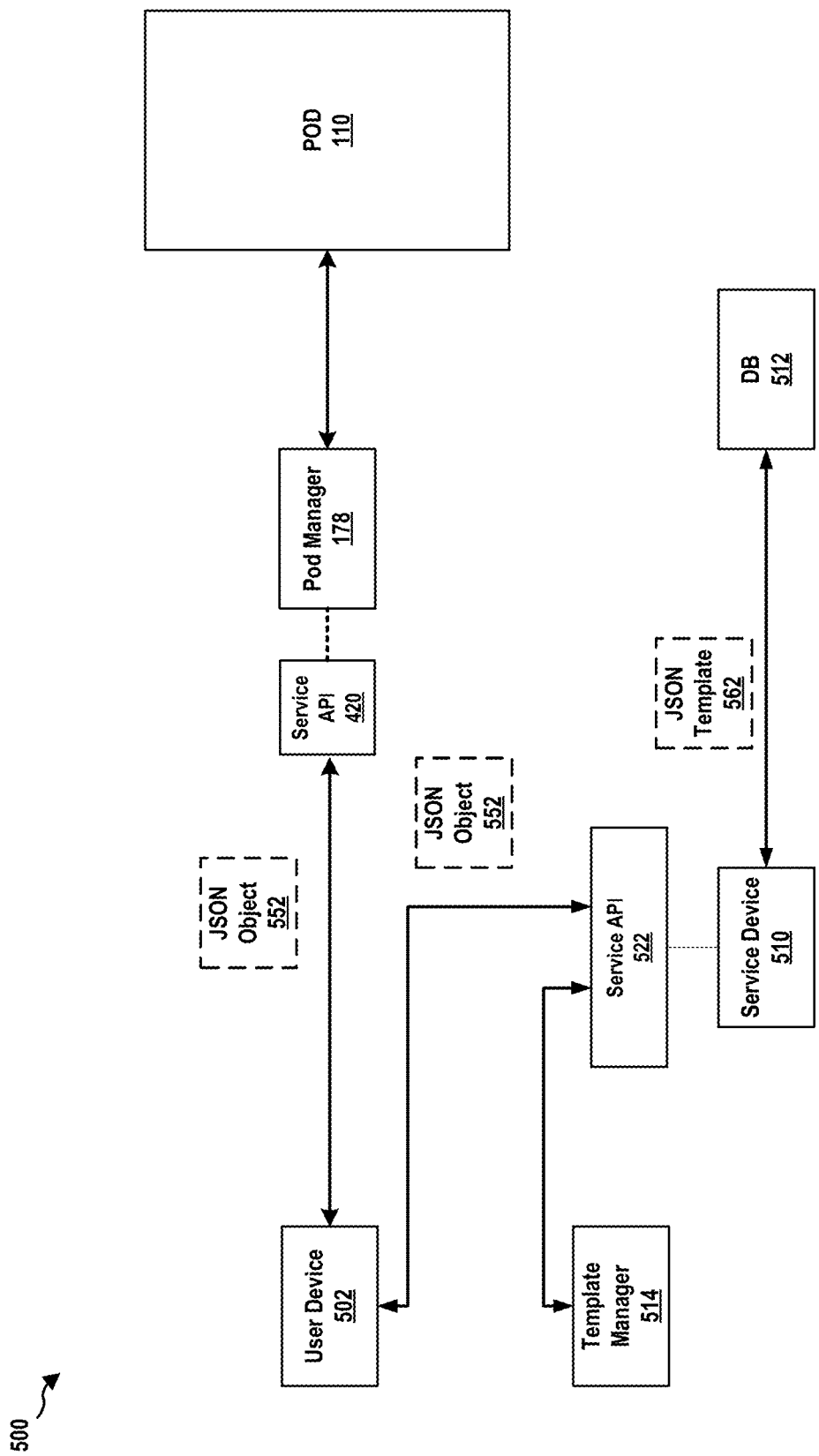
FIG. 5 is a diagram illustrating a computer system.

FIG. 5 is a diagram illustrating a computer system 500. The computer system 500 includes a user device 502, a service device 510, a database 512, and a template manger 514. The computer system 500 is in communication with the pod manager 178 serving the computing pod 110. As described supra, the user device 502 may request the pod manager 178 to compose a machine (or node) or to execute an action on a composed node. For example, the user device 502 may send a service request to the pod manager 178 through the service API 420. As described supra, the service API 420 is a REST-based API. In this example, the service API 420 supports JSON representations. Accordingly, the user device 502 may represent the service request in a JSON object 552 (e.g., according to a JSON template supported by the pod manager 178) and may send to the pod manager 178 the JSON object 552 as a payload of a command (e.g., one of HTTP GET, POST, PUT, PATCH, DELETE commands). In particular, to create a composed node using the service API 420 of the pod manager 178, the user device 502 may create a JSON object 552 specifying requested resources of the computing pod 110. The user device 502 may then perform a HTTP POST request on Composed Node Collection Action URI located at, for example, "/redfish/v1/Nodes/Actions/Allocate" on the pod manager 178. The JSON object 552 may contain various details of resources of the computing pod 110 to be used in the composed node.

FIG. 6 shows an exemplary JSON object 552. In certain configurations, the requirements described in the JSON object 552 are treated as a minimal required value, so the resulting composed node may have better parameters than requested. In this example, as shown in FIG. 6, the requested name for the composed node is "Node1." The requested description of the composed node is "Node for MegaRAC." Regarding the requested processors, the model is "Multi-Core Intel® Xeon® processor 7xxx Series." The requested number of cores of a processor is 8. The requested achievable speed of a processor is 3700 MHz. The requested brand is "E5" Regarding the requested memory, the requested capacity is 16384 MiB. The requested data width bits are 64. The requested memory device type is DDR4. Regarding the requested local drives, the requested capacity is 300 GiB.

After the user device 502 sends a JSON object 552 to the pod manager 178 for composing a new machine, the user device 502 may also send the same JSON object 552 to a service API 522 of the service device 510 for storage and future reuse of the JSON object 552. More specifically, the user device 502 sends the JSON object 552 to a particular function of the service API 522 to request to service device 510 to store the JSON object 552. In certain configurations, the service API 522 may be a REST-based (RESTful) API. The user device 502 sends a HTTP POST command with the JSON object 552 as a payload to a particular URI of the service device 510.

The service device 510 receives the JSON object 552 from the user device 502 through a function of the service API 522. For example, the service API 522 may provide a particular function to receive a JSON object constructed for composing a machine. In other words, the service device 510 treats each JSON object received through this particular function as a JSON object for composing a machine. The service device 510 may store the JSON object in the database 512 with such information.

In certain configurations, the service device 510 may construct a JSON template 562 and may then include the received JSON object 552 in the JSON template 562 as a payload. The service device 510 may include additional information in the JSON template 562 to indicate the context, the identifier, the type, the name, a description, etc. of the JSON template 562. After the JSON template 562 is completely constructed, the service device 510 stores the JSON template 562 in the database 512.

FIG. 7 shows an exemplary JSON template 562 constructed by the service device 510 based on the JSON object 552 of the FIG. 6. The JSON template 562 includes an OData information section 710, a template information section 720, and a payload section 730. OData (Open Data Protocol) is an Organization for the Advancement of Structured Information Standards (OASIS) standard that defines a set of best practices for building and consuming RESTful APIs. "OData Version 4.0. 2 Jun. 2016" specification is incorporated herein by reference in its entirety The OData information section 710 includes a context (i.e., "@odata.context") property that tells a generic client how to find the service metadata describing the types exposed by the service and describes the source of the payload. The OData information section 710 further includes a resource identifier (i.e., @odata.id) that identifies the resource. The OData information section 710 also includes a type (i.e., @odata.type) property that specifies the type of the resource as defined within, or referenced by, the metadata document. The template information section 720 indicates an ID, a name, a description, and a type of the JSON template 562. The name is a user defined name of the template. The description is a user defined description of the template. The type may be "node," "reset," "boot," "config," etc. The payload section 730 includes a payload such as the JSON object 552 in this example.

Similarly, the user device 502 may send other service requests in the form of JSON objects to the pod manager 178 (e.g., via the service API 420). For example, one such JSON object may specify a particular action to be executed by a composed node of the computing pod 110. One exemplary action is "Reset," which may include a "ResetType" attribute. The value of "ResetType" may be set to one of the following: "On" (requesting to turn the system on); "ForceOff" (requesting to turn the system off immediately (non-graceful) shutdown); "GracefulRestart" (requesting to perform a graceful system shutdown followed by a restart of the system); "ForceRestart" (requesting to perform an immediate (non-graceful) shutdown, followed by a restart of the system); "Nmi" (requesting to generate a nonmaskable interrupt to cause an immediate system halt); "ForceOn" (requesting to turn the system on immediately); and "PushPowerButton" (requesting to simulate the pressing of the physical power button on this system).

Another exemplary action is "BootSource Override," which may be set to one of the following values: None (booting from the normal boot device); "Pxe" (booting from the preboot execution (PXE) environment); "Floppy" (booting from the floppy disk drive); "Cd" (booting from the CD/DVD disc); "Usb" (booting from a USB device as specified by the system BIOS); and "Hdd" (booting from a hard drive).

The user device 502 may also choose to send such JSON objects to the service device 510 for storage and future reuse. Similarly to what was described supra, the service device 510 can construct JSON templates based on those JSON objects and then store those JSON templates in the database 512.

In certain configurations, the user device 502 may utilize the JSON templates stored in the database 512 to execute certain bulk background processes. In one example, the user device 502 may run a script to retrieve a JSON template 562 from the service device 510 and may then construct multiple similar JSON objects for composing multiple similar composed nodes in the computing pod 110. The user device 502 then sends the JSON objects to the pod manager 178. For example, the composed nodes may have variations in names, CPU numbers, or memory capacities, etc. After receiving the JSON objects, the pod manager 178 may start to allocate resources of the computing pod 110 to compose the requested machines.

In another example, the user device 502 may retrieve an action JSON template from the service device 510 and then construct multiple JSON objects that each request a selected, different composed node to execute the same corresponding action. The user device 502 then sends the JSON objects to the pod manager 178. In one instance, the action may be "BootSource Override" that changes the boot source to a particular type of source. After receiving the JSON objects, the pod manager 178 may start to change the boot sources of the composed nodes indicated by those JSON objects. In another instance, the action may be "Reset" of a particular type (e.g., "ForceRestart") at a scheduled time. After receiving the JSON objects, the pod manager 178 may instruct the composed nodes indicated by those JSON objects to execute the reset action at the scheduled time.

In certain configurations, the template manger 514 can manage the JSON templates stored in the database 512 through the service API 522. The template manger 514 may edit properties of the stored JSON templates or delete one or more of the stored JSON templates.

Figure 8:
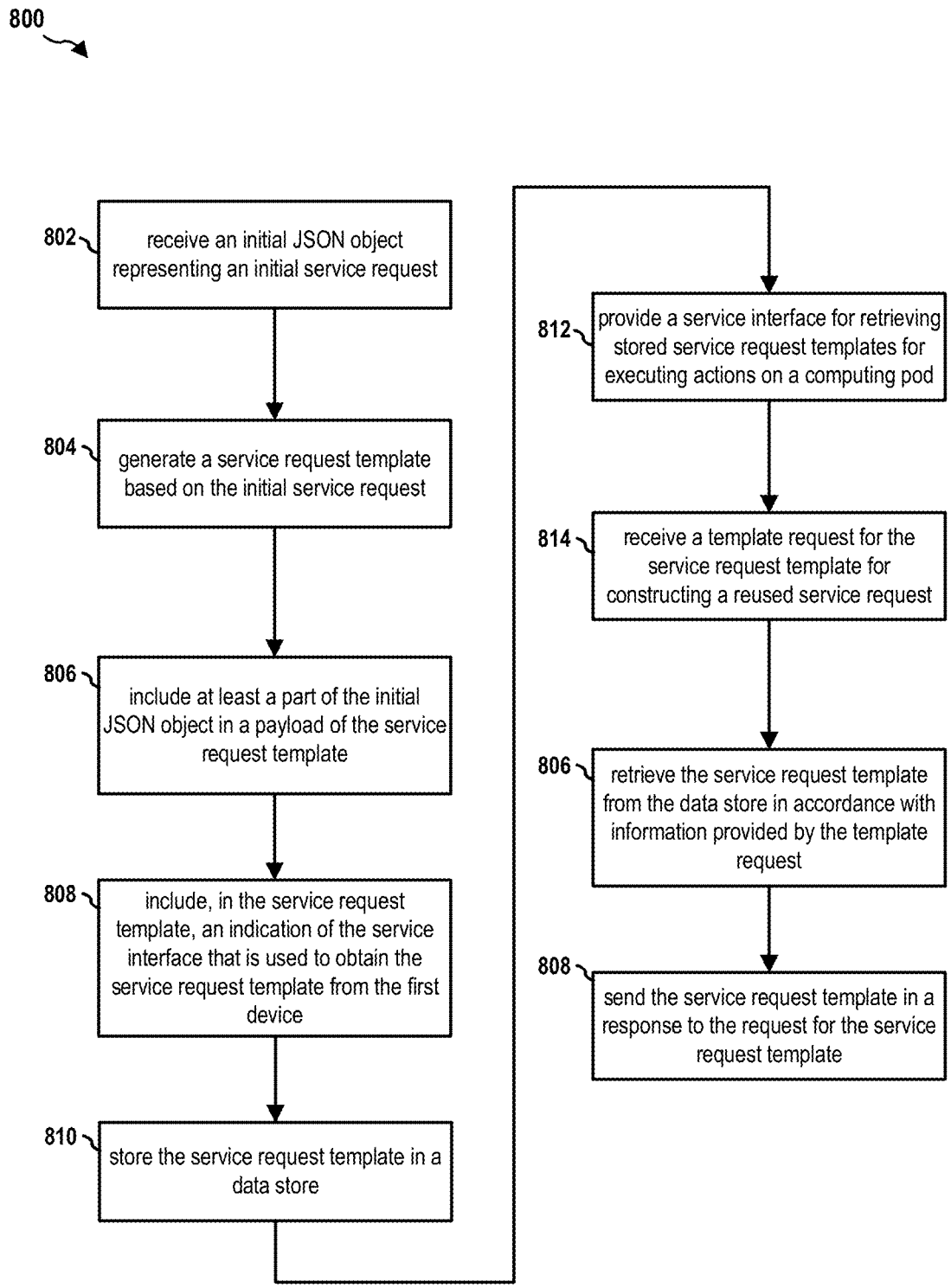
FIG. 8 is a flow chart of a method (process) for operating a service processor.

FIG. 8 is a flow chart 800 of a method (process) for operating a computer system. At operation 802, a first device (e.g., the service device 510) of the computer system receives an initial JSON object (e.g., the JSON object 552) representing an initial service request. At operation 804, the first device generates a service request template (e.g., the JSON template 562) based on the initial service request. At operation 806, the first device includes at least a part of the initial JSON object in a payload of the service request template. At operation 808, the first device includes, in the service request template, an indication of a service interface (e.g., the service API 522) that is used to obtain the service request template from the first device. At operation 810, the first device stores the service request template in a data store (e.g., the database 512).

At operation 812, the first device provides the service interface for retrieving stored service request templates for executing actions on a computing pod (e.g., the computing pod 110). At operation 814, the first device receives, at the service interface, a template request for the service request template for constructing a reused service request, the reused service request requesting the computing pod to execute a first action. In certain configurations, the computer system includes a second device (e.g., the user device 502). The second device sends the template request to the service interface at the first device. In certain configurations, the reused service request is to be constructed in a form of a reused JSON object (e.g., the JSON object 552). In certain configurations, the first action requested by the reused JSON object is to compose a composed node in accordance with hardware requirements contained in the reused JSON object. In certain configurations, the first action requested by the reused JSON object is an action of a particular composed node of the computing pod.

At operation 816, the first device retrieves the service request template from the data store in accordance with information provided by the template request. At operation 818, the first device sends the service request template in a response to the template request. In certain configurations, the second device receives the service request template from the first device. The second device constructs the reused service request based on the service request template. The second device sends the reused service request to a pod manager of the computing pod.

In certain configurations, the second device constructs a plurality of service requests based on the service request template. Each of the plurality of service requests specifying hardware requirements for composing a composed node contained in a payload of the service request template. The second device sends the plurality of service requests to the pod manager.

Figure 9:
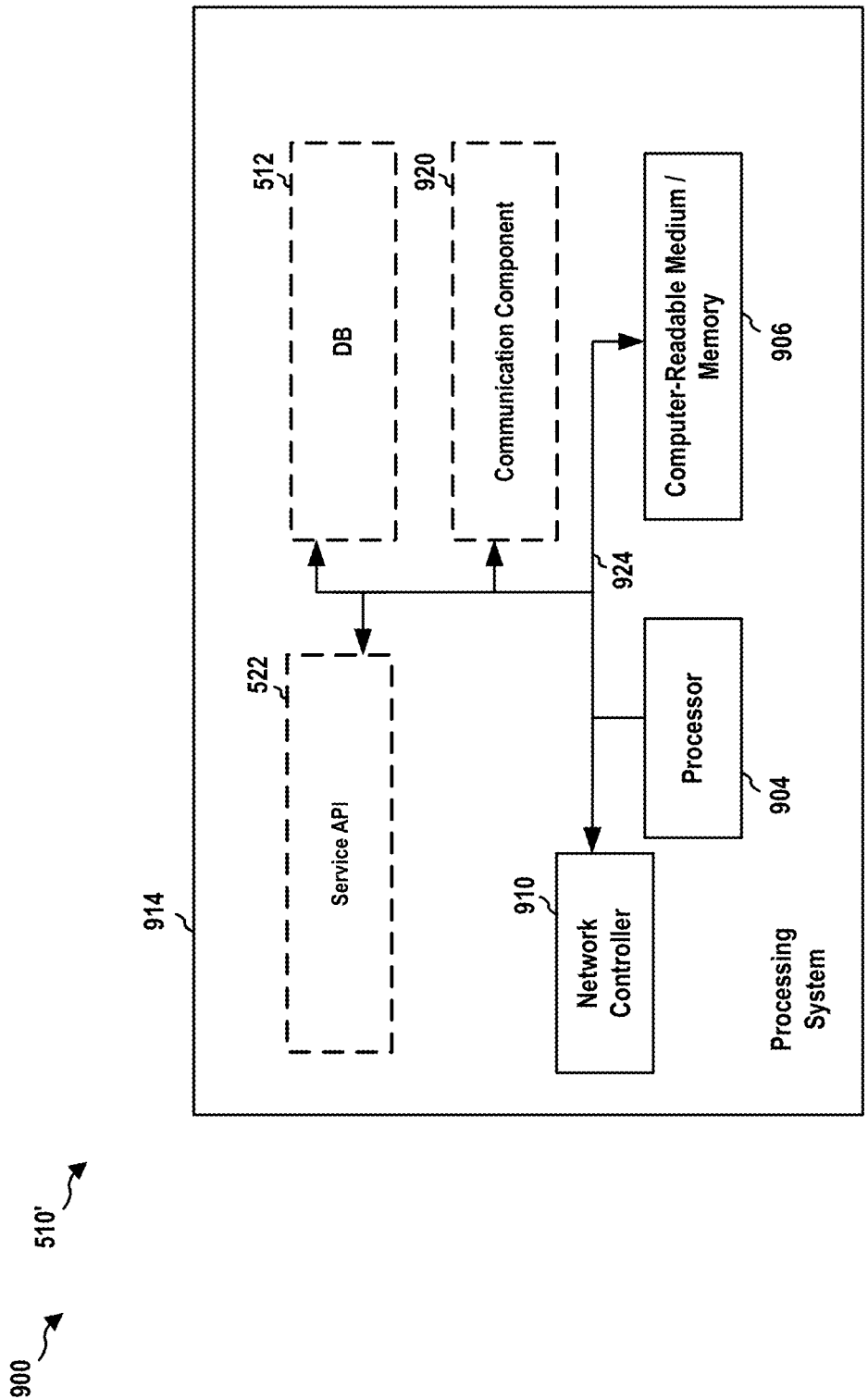
FIG. 9 is a diagram illustrating an example of a hardware implementation for an apparatus employing a processing system.

FIG. 9 is a diagram 900 illustrating an example of a hardware implementation for an apparatus 510' employing a processing system 914. The apparatus 510' may implement the service device 510. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by a processor 904, a network controller 910, and a computer-readable medium/memory 906. In particular, the computer-readable medium/memory 906 may include the memory 114 and the storage 117. The bus 924 may also link various other circuits such as timing sources, peripherals, voltage regulators, and power management circuits, which are well known in the art, and therefore, will not be described any further.

The processing system 914 may be coupled to the network controller 910. The network controller 910 provides a means for communicating with various other apparatus over a network. The network controller 910 receives a signal from the network, extracts information from the received signal, and provides the extracted information to the processing system 914, specifically a communication component 920 of the apparatus 510'. In addition, the network controller 910 receives information from the processing system 914, specifically the communication component 920, and based on the received information, generates a signal to be sent to the network. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the database 512 and the service API 522. The components may be software components running in the processor 904, resident/stored in the computer readable medium/memory 906, one or more hardware components coupled to the processor 904, or some combination thereof.

The apparatus 510' may be configured to include means for performing operations described supra referring to FIG. 8. The aforementioned means may be one or more of the aforementioned components of the service device 510 and/or the processing system 914 of the apparatus 510' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
providing, at a first device of the computer system, a service interface for retrieving stored service request templates for executing actions on a computing pod containing pooled hardware resources;
receiving, at the service interface of the first device and from a second device, a template request for a service request template for constructing a reused service request, the reused service request requesting the computing pod to compose a hardware node in accordance with hardware requirements contained in the reused service request;
retrieving, at the service interface of the first device, the service request template from a data store in accordance with information provided by the template request; and
sending, at the service interface of the first device and to the second device, the service request template in a response to the template request;
receiving, at the second device, the service request template from the first device;
constructing, at the second device, the reused service request based on the service request template;
sending, at the second device, the reused service request to a pod manager of the computing pod; and
allocating, at the pod manager, hardware resources of the computing pod to compose a hardware node in accordance with the reused service request.

2. The method of claim 1, wherein the reused service request is to be constructed in a form of a reused JavaScript Object Notation (JSON) object.

3. The method of claim 2, further comprising:
receiving an initial JSON object representing an initial service request;
generating the service request template based on the initial service request;
including at least a part of the initial JSON object in a payload of the service request template;
including, in the service request template, an indication of the service interface that is used to obtain the service request template from the first device; and
storing the service request template in the data store.

4. The method of claim 1, wherein the computer system includes a second device, the method further comprising:
sending, at the second device, the template request to the service interface at the first device.

5. The method of claim 4, the method further comprising:
constructing a plurality of service requests based on the service request template, each of the plurality of service requests specifying hardware requirements for composing a hardware node contained in a payload of the service request template; and
sending the plurality of service requests to the pod manager.

6. A computer system, comprising:
a first device including
a memory; and
at least one processor coupled to the memory and configured to:

provide a service interface for retrieving stored service request templates for executing actions on a computing pod containing pooled hardware resources;

receive, at the service interface of the first device and from a second device, a template request for a service request template for constructing a reused service request, the reused service request requesting the computing pod to compose a hardware node in accordance with hardware requirements contained in the reused service request;

retrieve, at the service interface of the first device, the service request template from a data store in accordance with information provided by the template request; and send, at the service interface of the first device and to the second device, the service request template in a response to the template request;

a second device, including:
 a memory; and
 at least one processor coupled to the memory and configured to:
  receive the service request template from the first device;
  construct the reused service request based on the service request template; and
  send the reused service request to a pod manager of the computing pod,
  wherein the pod manager allocate hardware resources of the computing pod to compose a hardware node in accordance with the reused service request.

7. The computer system of claim 6, wherein the reused service request is to be constructed in a form of a first JavaScript Object Notation (JSON) object.

8. The computer system of claim 6, wherein the at least one processor is further configured to:
 receive an initial JSON object representing an initial service request;
 generate the service request template based on the initial service request;
 include at least a part of the initial JSON object in a payload of the service request template;
 include, in the service request template, an indication of the service interface that is used to obtain the service request template from the first device; and
 store the service request template in the data store.

9. The computer system of claim 6, further comprising:
 wherein the at least one processor of the second device is further configured to:
 send the template request to the service interface at the first device.

10. The computer system of claim 9, wherein the at least one processor of the second device is further configured to:
 construct a plurality of service requests based on the service request template, wherein each of the plurality of service requests specifying hardware requirements for composing a hardware node contained in a payload of the service request template; and
 send the plurality of service requests to the pod manager.

11. Non-transitory computer-readable media storing computer executable code for operating a computer system, comprising:
 a first non-transitory computer-readable medium, including code to instruct a first device of the computer system to:
  provide a service interface for retrieving stored service request templates for executing actions on a computing pod;
  receive, at the service interface, a template request for a service request template for constructing a reused service request, the reused service request requesting the computing pod to execute a first action;
  retrieve the service request template from a data store in accordance with information provided by the template request; and
  send the service request template in a response to the template request,
 a second non-transitory computer-readable medium, including code to instruct a second device of the computer system to:
  receive the service request template from the first device;
  construct the reused service request based on the service request template; and
  send the reused service request to a pod manager of the computing pod, wherein the pod manager allocate hardware resources of the computing pod to compose a hardware node in accordance with the reused service request.

12. The non-transitory computer-readable media of claim 11, wherein the reused service request is to be constructed in a form of a first JavaScript Object Notation (JSON) object.

13. The non-transitory computer-readable media of claim 11, wherein the code of the first medium is further configured to:
 receive an initial JSON object representing an initial service request;
 generate the service request template based on the initial service request;
 include at least a part of the initial JSON object in a payload of the service request template;
 include, in the service request template, an indication of the service interface that is used to obtain the service request template from the first device; and
 store the service request template in the data store.

14. The non-transitory computer-readable media of claim 11,
 wherein the code of the second medium is further configured to instruct the second device to:
 send the template request to the service interface at the first device.

* * * * *